April 27, 1965
B. E. OHLSON
3,180,364
SUCTION CLEANER HOSE
Original Filed April 1, 1958
2 Sheets-Sheet 1
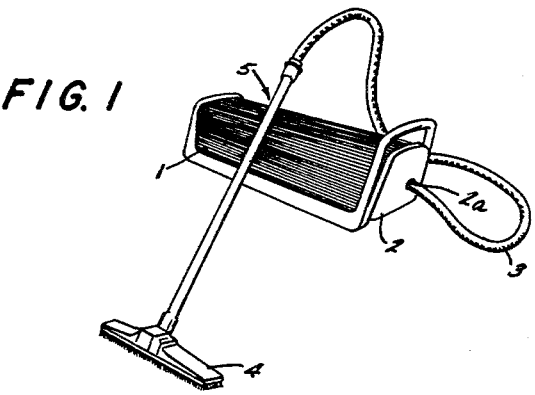
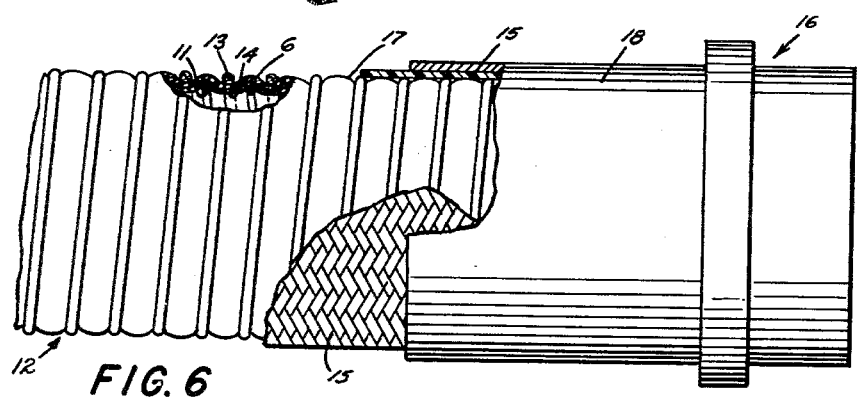
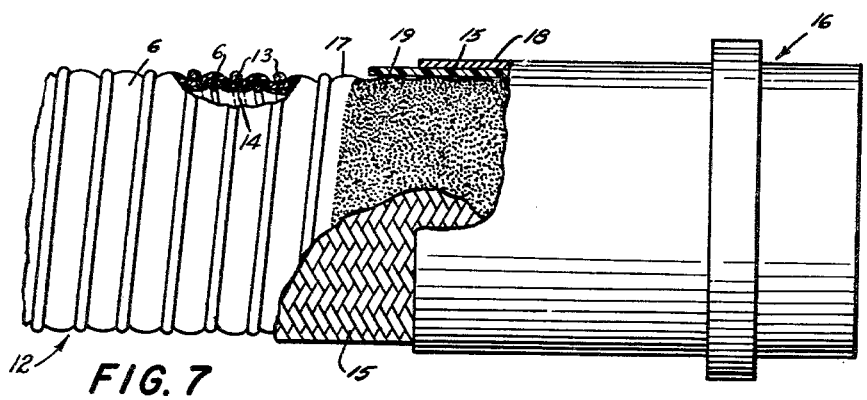
INVENTOR.
Bengt Erik Ohlson
BY
his ATTORNEY

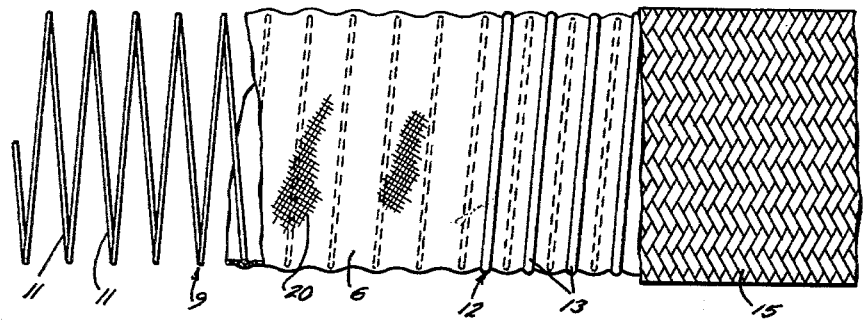
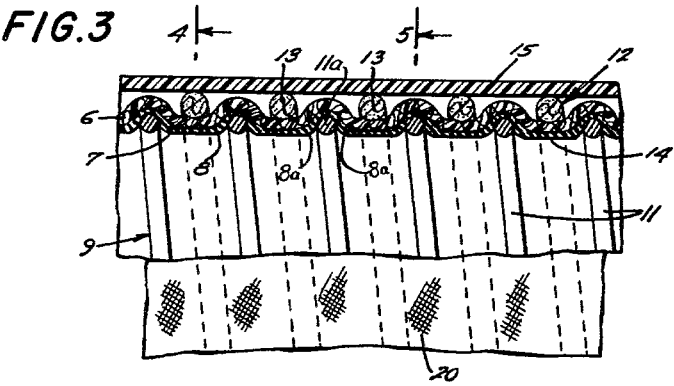
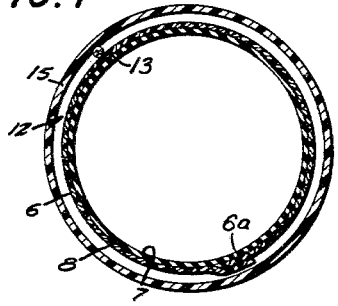
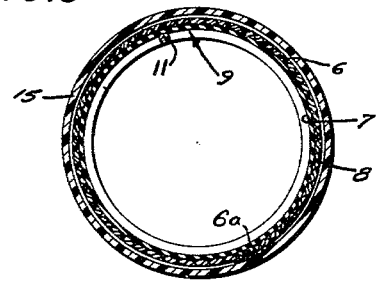

United States Patent Office 3,180,364
Patented Apr. 27, 1965

3,180,364
SUCTION CLEANER HOSE
Bengt Erik Ohlson, Montreal West, Canada, assignor to Aktiebolaget Electrolux, Stockholm, Sweden, a corporation of Sweden
Continuation of application Ser. No. 725,736, Apr. 1, 1958. This application Feb. 6, 1963, Ser. No. 256,653
1 Claim. (Cl. 138—122)

My invention relates to an air hose, and more particularly to an air hose suitable for use with suction cleaners. This application is a continuation of my application Serial No. 725,736, filed April 1, 1958, now abandoned.

Suction cleaners of the kind which employ a hose to connect the suction cleaner and a cleaning tool or nozzle have an advantage over upright suction cleaners in which the cleaning nozzle forms a unitary part of the base of the cleaner in that they do not need to be moved over all areas of a surface to be cleaned. An upright suction cleaner must be moved in its entirety with the nozzle. This advantage is dependent upon the convenience with which the hose can be manipulated and more particularly upon the weight and flexibility of the hose.

In suction cleaners of the type to which a hose is detachably connected, it is desirable to provide a hose which possesses certain physical characteristics. The hose preferably should be strong and durable and light in weight. Also, the hose should be neither unduly stiff nor unduly flexible.

Suction cleaner hoses for many years have been formed of muslin impregnated and lined with rubber and supported by a helix formed of closely spaced turns of wire. While hoses of this kind have been widely used, they have generally been regarded as unsatisfactory because they are not durable and are heavy and too stiff.

Although a certain amount of stiffness is desirable in a hose for guiding a cleaner being pulled by the hose, by general standards a suction hose formed of muslin impregnated and lined with rubber is considered unsatisfactory because of its excess stiffness. Further, a muslin hose is unsatisfactory because, for easy maneuverability of a nozzle or cleaning tool, a certain amount of flexibility is also desirable in a hose, which a muslin hose lacks.

Recognition of the foregoing shortcomings of muslin hoses prompted the development of the now commonly used corrugated plastic hose, which is merely a tube formed of thin-walled, rather inflexible plastic provided with circumferentially extending corrugations to impart flexibility to the tube. The corrugated plastic tubes are light in weight and have improved flexibility. However, they have the disadvantage of being highly susceptible to fracture by puncturing or excessive bending, and the further disadvantage that they quickly accumulate dirt smudges which are unsightly and difficult to remove. Also, corrugated plastic hoses are not satisfactory because their flexibility is greater than desired and they lack the small degree of stiffness which is helpful to guide a cleaner and control its movement on the floor when the cleaner is being pulled from place to place by the hose. Further, plastic hoses possess the disadvantage that they are adversely affected by low temperatures.

I have discovered a hose construction which is free of the aforementioned disadvantages inherent in corrugated plastic hoses, and when compared to the aforementioned muslin hoses, is significantly lighter in weight, possesses optimum stiffness for guiding the cleaner and controlling its movement on the floor and optimum flexibility for manipulating a cleaning tool or nozzle, and has far greater durability.

According to the invention, a hollow cleaner air hose for flowing air therethrough is formed of a tubular shaped piece of fibrous nylon treated to impart thereto adhesiveness for rubber, and impregnated and lined with rubber. The nylon tube is supported and rendered shape-retaining by a helix of closely spaced turns which is disposed coaxially within the tube. The hose of the invention is from about five to six times as durable as the prior art muslin hose, and its improved lightness, slight stiffness for guiding purposes, and flexibility are immediately apparent upon handling. Moreover, and surprisingly, the hose is air-tight notwithstanding the fact that lightweight nylon fabric is used.

Embodiments of the invention are depicted in the accompanying drawings. These representations of the invention are intended merely to be illustrative thereof and are not intended to set forth the limitations of the invention. In the drawing:

FIG. 1 is a perspective view showing a hose embodying the invention connected to a suction cleaner;

FIG. 2 is a side view of a hose of the kind illustrated in FIG. 1 having portions thereof cut away so as to illustrate the construction;

FIG. 3 is another side view, partially broken away and in section, of the hose shown in FIG. 1;

FIG. 4 is a transverse sectional view taken along line 4—4 in FIG. 3;

FIG. 5 is a transverse sectional view taken along line 5—5 in FIG. 3;

FIG. 6 is a side view, partially broken away and in section, of a hose like that shown in FIGS. 2 to 5 provided with an end fitting in accordance with one embodiment of the invention; and FIG. 7 is a side view similar to FIG. 6 of a hose provided with an end fitting in accordance with another embodiment of the invention.

In the various views, like reference characters refer to corresponding parts.

Referring to the drawings, in FIG. 1 I have shown my invention in connection with a horizontal tank-type suction cleaner which includes a casing 1 having an end cover 2. The end cover 2 is provided with an inlet 2a to which a suction hose 3 is adapted to be removably secured in any suitable manner (not shown). Suitable cleaning appliances, such as a nozzle 4, for example, may be connected to a wand 5 which in turn is connected to the outer free end of the hose 3 and through which air is drawn into the casing 1 by a suitable motor-fan unit (not shown) disposed therein. Dust and dirt entrained in the air during a cleaning operation are separated from the air when the latter passes through a dust collecting member (not shown) disposed in the casing, and air from which dust and dirt have been removed is discharged from the casing 1 from the end thereof opposite the end cover 2. The hose 3 directly or with the aid of the wand 5 may be employed to manipulate the nozzle 4 or any other cleaning tool over a surface to be cleaned.

The hose 3 comprises a tubular-shaped piece 6 of nylon fabric impregnated with rubber, and coated on the inwardly disposed surface 7 thereof with a thin skim or layer 8 of rubber. Disposed coaxially within the nylon tube 6 is an inner helix 9 formed of closely spaced turns 11 of wire. The inner helix 9 engages the thin rubber layer 8 and provides support for the nylon fabric. Disposed coaxially without the nylon tube 6 is an outer helix 12 formed of closely spaced turns 13 of pliable fibrous cord such as jute twine, for example. The outer helix 12 is separated from the inner helix 9 only by the single layer 6 of rubber impregnated nylon fabric and its rubber skim 8. The turns 13 of outer helix 12 engage the outer surface of the nylon tube intermediate the inner helix turns 11, and press the nylon intermediate the inner helix turns 11 inward so that the hose inner wall 14 is substantially smooth.

From FIG. 3, it will be noted that the inner and outer helices coact to corrugate the body tube helically but that, between the convolutions of the inner helix 9, the inner face of the body tube, provided by thin rubber layer 8, extends cylindrically. Because of the high degree of flexibility of the nylon fabric, the rubber impregnation therein and the rubber surface layer, the flexible body tube snugly embraces the wire of inner helix 9, extending more than 180° about the circumference of the wire. In other words, the wire of inner helix 9 is almost completely embedded in the body tube made up by the nylon fabric and rubber. As clearly seen in FIG. 3, the portions of rubber layer 8 indicated at 14 between the convolutions of the inner helix combine with the inner helix to define a plain cylindrical inner wall for the hose which is interrupted only by helical indentations of insignificant size, one on each side of the wire making up the inner helix. The inner wall of the hose is thus essentially smooth.

A braided plastic tubular cover 15 is disposed outwardly of the nylon tube 6 and the outer helix 12. The braided plastic cover 15 can be formed of Saran, and is preferably polyethylene.

As best seen in FIG. 3, the inner diameter of each resilient convolution 11 of the inner helix 9 and the inner diameters of the portions of the rubber skim 8 between adjacent convolutions 11 of the inner helix 9 are substantially the same, thus forming the essentially smooth inner hose wall 14 of substantially plain cylindrical form which provides an unobstructed passage for flow of air therethrough. Also, the portions 8a of the rubber skim 8 immediately adjacent to the opposing lateral sides of each resilient convolution 11 are in intimate physical contact with the opposing lateral sides.

A feature of the hose of the invention is that conventional type reinforcement of the hose is not required at the regions at which hose end fittings are permanently affixed to the hose or at the regions adjacent to such fittings. Muslin hose usually includes an extra layer of fabric at the regions of the end fittings and regions adjacent thereto to obtain reinforcement for the regions at which the hose is introduced into the end fittings. Where the extra layer of fabric terminates beyond the fitting, there is an abrupt change in diameter, and hence wear is excessive and failure often occurs at this location. According to the invention, no reinforcement such as an extra layer of fabric is employed in hose of the kind under consideration. Fittings can be attached directly without any reinforcement, or reinforcement can be provided in the form of a thin film of rubber. These alternatives are shown respectively in FIGS. 6 and 7.

In the embodiment shown in FIG. 6 no reinforcement is employed. A hose fitting 16 is fixedly secured to one end portion 17 of the hose in a manner well known in the art. The fitting includes a hollow sleeve 18 which coaxially receives the hose end portion 17. The hose structure within and beyond the fitting is uniform and without reinforcement for stiffening the hose adjacent the fitting. The character of the hose, viz., its diameter, can vary beyond the fitting, as in the case of tapered hose, for example. The hose structure, however, is constant throughout its length.

In the embodiment shown in FIG. 7, end reinforcement in the form of a thin, brushed-on film 19 of rubber is employed. The film 19 coats the outer surface of the end portion 17. The end fitting 16 is applied to the hose in the same manner as in the embodiment shown in FIG. 6. The film 19 extends a short distance along the hose adjacent to and beyond the fitting. Otherwise, the hose structure is uniform. No fabric reinforcement is employed at the fitting or at the region adjacent to and beyond the fitting.

As explained above, the tubular-shaped piece 6 is formed of rubberized nylon fabric impregnated with rubber. The nylon fabric, which is formed of filaments of long chain polymeric amides having recurring amide groups as an integral part of the main polymer chain, is preferably a woven fabric including warp and woof threads 20. Advantageously, the woven fabric is so disposed that the warp and woof threads form circumferentially extending spirals, as indicated in FIG. 2. The longitudinally extending edges of the woven fabric overlap one another at 6a to provide the tubular-shaped piece, as shown in FIGS. 4 and 5. Improved strength and durability are incidents of this construction.

The nylon fabric is preferably lightweight. Nylon fabric weighing about two ounces per square yard and formed of 210 denier yarn having a count of 38 ends by 30 picks per square inch is suitable. Before being shaped into the form of an elongated tube, the fabric is rubberized so that it will take up rubber and form an air-impervious wall. Any suitable known rubberizing treatment can be employed. Treatments employing a solution of rubber latex and resorcinolformaldehyde, and treatments employing isocyanates are generally satisfactory.

Hoses according to the invention can be made in a manner similar to that in which the aforementioned prior art muslin hoses are made. Thus, the inner helix is made by winding wire on a mandrel, viz., .045" wire at 50 coils per foot, and nylon fabric cut on a bias and impregnated with partially cured rubber and having a thin (e.g., .012") skim of partially cured rubber on one surface thereof is wrapped around the inner helix so that the skim is on the inside. Cord is then wound over the nylon fabric so that the fabric is pressed into the spaces intermediate the turns of the inner helix, and the partially formed hose is then heated to cure the rubber, the rubber skim 8 being united to the rubber impregnating the woven nylon fabric 6. The rubber impregnating the body tube 6 continuously and tenaciously adheres to the threads 20 of the nylon fabric and the rubber skim 8 continuously and tenaciously adheres to the inner surface of the rubber impregnated nylon fabric layer. Following the heating, the plastic braided covering is applied.

The superior durability of the hose of the invention is easily demonstrated by subjecting the hose to standard durability tests. Such a test involves providing each end of the hose with a hose fitting, securing one fitting to an upwardly projecting vertically disposed spindle and allowing the other end of the hose to hang freely, both ends of the hose extending downward with the hose supported at its higher end by the spindle. The spindle is then rotated and the number of revolutions is taken as a measure of the durability of the hose. From testing in this manner, it has been determined that hose of the invention, which is substantially lighter than muslin hose, viz., about six ounces lighter for a seven foot hose, is from about five to six times more durable.

The reduction in weight realized by employing nylon in place of muslin is very substantial. Thus, for a 6½ foot hose, a reduction in weight of from 1 lb. 9 oz. to about 1 lb. 2.5 oz. is obtainable by the substitution. Weight can be reduced even more, viz., by about ½ oz., by employing linear polyethylene braid in place of commonly used plastic braid, such as Saran. These weight reductions are realized without any sacrifice in durability. In fact, durability is improved as an incident of the substitution of nylon for muslin.

The term "rubber" as used throughout the specification and the claim, unless otherwise indicated, is used in a generic sense to include natural rubber, rubber substitutes, compounded rubber, modified rubber, synthetic rubber and the like.

I claim:

A hollow suction cleaner hose for flowing air therethrough characterized by increased durability, decreased weight, adequate stiffness for guiding a suction cleaner when pulled by the hose and adequate flexibility for free manipulation of suction cleaner tools used there-with, comprising an inner supporting helix of spaced resilient convolutions, a flexible body tube enclosing said inner helix and supported thereby, an outer helix of pliable fibrous cord extending about said body tube and having spaced convolutions disposed between adjacent convolutions of said inner helix and engaging said body tube, and a flexible outer tube, said flexible body tube consisting of a single layer of woven nylon fabric impregnated with rubber and a rubber inner surface layer forming a rubber skim which is united to the rubber impregnating said woven nylon fabric and directly contacts the resilient convolutions of said inner helix, said woven nylon fabric having warp and woof threads forming circumferentially extending spirals, the rubber impregnating said layer of nylon fabric uniformly and tenaciously adhering to the threads of said nylon fabric and said rubber skim continuously and tenaciously adhering to the inner surface of said rubber impregnated nylon fabric layer, said flexible body tube being helically corrugated by said helices to form alternate ridges and grooves, said outer helix being separated from said inner helix only by said single layer of nylon fabric and its rubber skim, said rubber skim extending more than 180° about the circumference of each resilient convolution of said inner helix with said inner helix having inner exposed surface portions at the inner hose wall, the inner diameter of each resilient convolution of said inner helix and the inner diameter of the portions of said rubber skim between adjacent convolutions of said inner helix being substantially the same, the portions of said rubber skim which are immediately adjacent to the opposing lateral sides of each resilient convolution of said inner helix being in intimate physical contact with said opposing lateral sides, and said flexible outer tube being of substantially cylindrical form disposed outwardly of said flexible body tube and the convolutions of the pliable fibrous cord of said outer helix.

References Cited by the Examiner

UNITED STATES PATENTS

| | | | |
|---|---|---|---|
| 1,925,231 | 9/33 | Bundy | 138—122 |
| 2,597,806 | 5/52 | Martin | 138—122 |
| 2,897,840 | 8/59 | Roberts et al. | 138—122 |
| 2,917,568 | 12/59 | Moorman et al. | 138—122 XR |

FOREIGN PATENTS

| | | |
|---|---|---|
| 993,619 | 7/51 | France. |
| 261,666 | 11/26 | Great Britain. |
| 349,965 | 5/31 | Great Britain. |
| 740,732 | 11/55 | Great Britain. |

LEWIS J. LENNY, *Primary Examiner.*

EDWARD V. BENHAM, *Examiner.*